3,188,304
COLD RUBBER POLYMERIZATION PROCESSES USING A MIXTURE OF DECYL AND UNDECYL MERCAPTANS AS MODIFIERS
Roland H. Goshorn, Fort Washington, Harry E. Albert, Lafayette Hill, Bernard Buchholz, Flourtown, and Alfred C. Whiton, Norristown, Pa., assignors to Pennsalt Chemicals Corporation, Philadelphia, Pa., a corporation of Pennsylvania
No Drawing. Filed July 17, 1961, Ser. No. 124,318
6 Claims. (Cl. 260—84.3)

This invention deals with the preparation of synthetic rubber as obtained from styrene and butadiene and is particularly concerned with the use of certain mercaptans as modifiers in those polymerization processes carried out below about 50° F. (e.g. cold rubber processes).

It is old in the art to use mercaptans as modifiers in the emulsion polymerization of olefinic monomers such as styrene and butadiene to obtain elastomeric products. Such polymerization modifiers are substances which are included in a polymerization recipe to make possible the production of a plastic, workable polymer. With no modifier present in the recipe a tough, unworkable polymer is produced. The exact role which the modifier plays in a free-radical initiated polymerization has been the subject of much study, especially in butadiene-styrene emulsion copolymerization systems and it has been established that the modifier functions primarily as a chain transfer agent in a free radical mechanism, and in this manner it controls the molecular weight (and hence the processability) of the polymer.

Wollthan, in his U.S. Patent 2,281,613, disclosed that control of the polymerization is provided and plasticity of the polymers obtained by incorporating in the aqueous emulsion an aliphatic mercaptan having at least six carbon atoms in an aliphatic linkage. In U.S. 2,378,030 Olin disclosed his improvement in the use of aliphatic mercaptans having between 8 and 16 carbon atoms and pointed out the particular advantage of achieving high efficiency in the use of tertiary-dodecyl mercaptan as obtained by condensation of triisobutylene with hydrogen sulfide. Additional study in the use of mercaptan modifiers resulted in additional advances. For example, Crouch and Mashofer described in U.S. Patents 2,549,961 and 2,549,962 the advantage of using blends of tertiary alkyl mercaptans having 8 to 16 carbon atoms per molecule. In all of the above disclosures the research was directed to and the disclosures are specific to the use of such mercaptan modifiers in styrene-butadiene polymerization recipes carried out at about 50° C. or higher.

Immediately after World War II, however, it was learned that rubber having improved properties for tire treads was obtained when polymerization was carried out at temperatures of about 50° F. or lower and in the presence of an organic peroxide or hydroperoxide initiator. This development lead to the well-known "cold" rubber of commerce. In using modifiers for the cold polymerization recipes the industry logically used the same mercaptan modifiers employed for the previously known "hot" rubber recipes and these were found to work quite well. Of particular value and predominantly used were tertiary-dodecyl mercaptan and a mixture of tertiary mercaptans containing 12, 14 and 16 carbon atoms.

Now, however, it has been found that mercaptan modifiers are not equivalent in "hot" and "cold" rubber emulsion polymerization systems. Surprisingly, in accord with this invention, significant improvements are obtained in "cold" polymerization recipes for a styrene-butadiene system when a modifier is employed which is a mercaptan containing 9, 10 or 11 carbon atoms in its molecule (i.e., nonyl, decyl, and undecyl mercaptans) and these improvements result also when the modifier used is a mixture of these mercaptans.

One particular advantage found in using nonyl, decyl or undecyl mercaptan as a modifier in "cold" rubber polymerization recipes is that improved modifier efficiency is obtained. Modifier efficiency can be empirically measured in a synthetic rubber polymerization system by measuring the Mooney viscosity of the dry polymer produced from such a system. At a given concentration level in the system, a modifier which produces a soft (low Mooney viscosity) polymer is classified as more efficient than a modifier which produces a stiff (high Mooney viscosity) polymer. The processability of a polymer is dependent upon its viscosity and an efficient modifier is desired in synthetic rubber recipes, since less of it will be required to produce a polymer of specified Mooney viscosity. Another specific advantage obtained from this invention is that the use of the decyl and undecyl mercaptans or their mixture is not adversely affected by the presence of residual olefin which is often present in the mercaptan from its process of manufacture. This is particularly important where unreacted styrene used in the "cold" rubber manufacture is recycled for further polymerization with the butadiene component. As this recycle occurs, the olefin contaminant from the mercaptan builds up in the styrene monomer. With dodecyl mercaptan, for example, the presence of small amounts of the olefin from which the mercaptan is derived can build up to an amount on the order of 0.1 to 0.2 part per hundred parts of monomer and this significantly reduces modifier efficiency and causes the rubber obtained to be stiff and undesirable. On the other hand, use of decyl and undecyl mercaptans contaminated with starting, unreacted olefin (e.g. decenes and undecenes) causes no adverse effects and actually results in a slight improvement in efficiency.

Still another unexpected advantage in the use of nonyl, decyl and undecyl mercaptans or their mixtures is that they enable a high conversion rate to be achieved. It has been observed that the conversion rate is adversely affected when certain mercaptans (particularly those containing less than nine carbon atoms) are used in "cold" rubber polymerization recipes.

In order to facilitate discussion of the mercaptans they will be referred to as $C_x$ mercaptans where C refers to a hydrocarbon radical and $x$ is the number of carbon atoms per molecule. Thus, $C_9$ is nonyl mercaptan, $C_{10}$ is decyl mercaptan, $C_{11}$ is undecyl mercaptan, etc. The $C_9$, $C_{10}$, and $C_{11}$ mercaptans used in accord with the invention have highly branched alkyl chains and are predominantly secondary and tertiary mercaptans. These compounds are readily prepared in accord with the known methods for the addition of $H_2S$ to olefins. Because mixtures of olefins are normally used for the $H_2S$ addition, rectification of the mercaptan mixture is carried out to isolate the $C_9$, $C_{10}$, and $C_{11}$ mercaptans. Reference is made to U.S. 2,392,554 for details of the mercaptan preparation process. In that patent it is pointed out that these mercaptan mixtures are made by the method which comprises the reaction of hydrogen sulfide with an olefinic polymer selected from the group consisting of polymers of propylene, butylene, amylene and their mixtures.

It will be understood that the $C_9$, $C_{10}$, and $C_{11}$ mercaptans are not discrete compounds, but comprise isomer mixtures. As indicated above, however, the compounds are predominantly secondary and tertiary mercaptans and the purity of the rectified fractions will be on the order of 90–100% mercaptan by weight. It will also be understood, that the term "$C_{10}$ mercaptan" refers to a fraction consisting essentially of decyl mercaptan, but there will also be present small amounts of $C_{11}$ mercaptan and probably traces of other mercaptans. Likewise the term "$C_{11}$ mercaptan" refers to a fraction consisting essentially of undecyl mercaptan with decyl and other mercaptans present in small amounts. "$C_9$ mercaptan" is likewise predominantly nonyl mercaptan with trace amounts of other mercaptans. The $C_9$, $C_{10}$ and $C_{11}$ mercaptan mixtures will also be of a comparable purity and will contain the $C_9$, $C_{10}$, and $C_{11}$ mercaptan components in weight ratios ranging from about 10:90 to 90:10 for two component systems and for three component systems the lowest concentration of a single component will be about 5% by weight. Because of availability, the preferred modifier will be a $C_{10}$ and $C_{11}$ mixture which will consist essentially of approximately equal amounts by weight of $C_{10}$ and $C_{11}$ mercaptan. When using the $C_9$ component, it will be used preferably in a mixture with the $C_{10}$ and/or $C_{11}$ mercaptan because of its tendency to lower conversion rates. As indicated, the mercaptans are prepared by reaction of $H_2S$ with the appropriate olefins and since different sources of olefins will contain somewhat different proportions of components, the mercaptan products will vary accordingly. Complete purification is neither practical nor necessary. The following Table A indicates the physical properties of the $C_9$, $C_{10}$, and $C_{11}$ mercaptans and their mixtures as obtained from several commercial olefin sources:

In the actual polymerization procedure, normal polymerization ingredients and the usual operating techniques will be employed except that the mercaptan modifier will be a $C_9$, $C_{10}$, or $C_{11}$, or a mixture of these mercaptans. As indicated, peroxides or hydroperoxides will be used as catalysts (e.g. p-menthane hydroperoxide, cumene hydroperoxide, phenylcyclohexyl hydroperoxide, etc.) and such recipes for "cold" rubber recipes are discussed by G. S. Whitby in his book "Synthetic Rubber," John Wiley & Sons, 1954. The amount of modifier used will be in accord with usual practice and will vary from about 0.05–0.50 part per hundred parts of monomer. Less than this amount of modifier results in too stiff a polymer product whereas more than about 0.50 phm. causes too great a softening of the polymer. Preferably, from about 0.10 to 0.3 phm. will be used.

EXAMPLE 1

Butadiene-styrene copolymers were prepared by polymerization at 43° F. according to the following SBR-1500 recipe.

| Ingredients: | Parts by weight |
|---|---|
| Butadiene | 72 |
| Styrene | 28 |
| Water | 200 |
| Mercaptan | Variable |
| Rosin soap ("Dresinate" 214) | 4.50 |
| Sodium sulfonate dispersant ("Daxad" 11) | 0.10 |
| Sequestrant (Versene $Fe_3$ Specific) | 0.04 |
| $FeSO_4 \cdot 7H_2O$ | 0.12 |
| $K_4P_2O_7$ | 0.15 |
| $Na_3PO_4 \cdot 12H_2O$ | 0.30 |
| p-Menthane hydroperoxide | 0.04 |

The mercaptans used were $C_9$, $C_{10}$, $C_{11}$, a mixture of essentially 50:50 parts by weight of $C_{10}$ and $C_{11}$ mercaptans and, as a control, a polymer made with commercial $C_{12}$ mercaptan obtained by reaction of propylene tetramer with $H_2S$. A separate control polymer was used for comparison in each case in order to overcome any differences due to polymerization technique in the batch polymerization employed. Results are determined by comparing

*Table A*

PROPERTIES OF MERCAPTAN

| Olefin | $C_{10}SH$ and $C_{11}SH$ mixture | $C_{10}SH$ fraction | $C_{11}SH$ fraction | $C_9SH$, $C_{10}SH$, and $C_{11}SH$ mixture | $C_9SH$ |
|---|---|---|---|---|---|
| Source A:<br>$C_8$—0.8%<br>$C_9$—1.5%<br>$C_{10}$—43.9%<br>$C_{11}$—44.7%<br>$C_{12}$—9.1% | Distillation range: 76°–90° C. at 5 mm.<br>Refr. index:<br>$n_D^{25}=1.4575$<br>percent S=17.7 | Distillation range: 90°–104.5° C. at 15 mm.<br>$n_D^{25}=1.4562$<br>percent S=18.1<br>(Theory=18.4) | Distillation range: 78°–82° C. at 4 mm.<br>$n_D^{25}=1.4578$<br>percent S=17.3<br>(Theory=17.0) | — | — |
| Source B:<br>$C_8$—4%<br>$C_9$—15%<br>$C_{10}$—53%<br>$C_{11}$—25%<br>$C_{12}$—3% | — | Distillation range: 96°–105° C. at 15 mm.<br>$n_D^{25}=1.4570$<br>percent S=18.2 | — | Distillation range: 89°–112° C. at 20 mm.<br>$n_D^{25}=1.4569$<br>percent S=17.7 | — |
| Source C:<br>Commercial $C_9$. | — | — | — | — | B.P. 198° C. at 760 mm.<br>percent S=19.3 |

As indicated, the $C_9$, $C_{10}$, and $C_{11}$ mercaptans will be used in accord with this invention in "cold" rubber polymerization recipes (i.e. in aqueous emulsion systems at temperatures between about 15° F. and 50° F.). The monomers employed for the elastomer preparation will be a diene such as butadiene or isoprene, and a comonomer such as styrene or alpha-methyl styrene.

Mooney viscosity values and the fairest comparison of these various mercaptans is achieved by comparing the difference in Mooney viscosity between the experimental and the control polymer. Mooney viscosity values were determined in the usual manner at 212° F. on the raw, uncompounded polymer after a one-minute preheat plus four minutes operation of the large rotor. The values obtained were then added to give the values in the table which follows:

*Table I*

EFFECT OF VARIOUS MERCAPTAN MODIFIERS ON BUTADIENE-STYRENE COPOLYMERS PREPARED BY SBR-1500 RECIPE

| Experimental ploymer modifier (0.20 phm.*) | Mooney viscosity (ML 1'+4' at 212° F.) | | Change in Mooney viscosity vs. control |
|---|---|---|---|
| | Experimental polymer | Control polymer (0.20 phm. $C_{12}SH$) | |
| $C_9SH$ | 55.5 | 58.0 | −2.5 |
| $C_{10}SH$ | 33.5 | 47.5 | −15.0 |
| $C_{11}SH$ | 33.5 | 55.5 | −22.0 |
| $C_{10}SH+C_{11}SH$ | 31.0 | 56.5 | −25.5 |

*phm.=parts per hundred parts of total monomers.

It is clearly evident from the data in the above table that the modifier efficiency of the $C_9$ mercaptan is greater than that of the commercially used $C_{12}$ mercaptan, and the $C_{10}$, $C_{11}$ and mixture of $C_{10}$ and $C_{11}$ mercaptans are very much superior in modifier efficiency.

On the other hand, when a $C_7$ and $C_8$ mercaptan was used in a similar test procedure, no improvement over the $C_{12}$ mercaptan was obtained and it was found that reaction rate was also very much lowered.

EXAMPLE 2.—EFFECT OF OLEFIN CONTAMINATION

Using the same SBR-1500 recipe and procedure of Example 1, polymers were prepared with 0.20 phm. of a $C_{12}$ and a mixture (essentially 50:50) of $C_{10}$ and $C_{11}$ mercaptan modifiers and also with these modifiers which were contaminated with the starting olefins from which the mercaptans were prepared by $H_2S$ addition. Again, Mooney viscosity values were used to compare modifier efficiencies with uncontaminated controls. Table II shows the experimental details and the results obtained.

*Table II*

SBR-1500 POLYMERS MODIFIED WITH ALKYL MERCAPTANS CONTAMINATED WITH OLEFINS

| Modifier (0.20 phm.) | Contaminant | Mooney viscosity (ML1'+ML 4' at 212° F.) |
|---|---|---|
| $C_{10}SH+C_{11}SH$ | 0.1 phm. $C_{10}$ and $C_{11}$ olefins | 35.0 |
| $C_{10}SH+C_{11}SH$ | None | 38.5 |
| $C_{12}SH$ | 0.1 phm. $C_{12}$ olefin | 61.5 |
| $C_{12}SH$ | None | 50.5 |

It is clear from Table II that a stiff rubber is obtained when as little as 0.1 phm. of $C_{12}$ olefin is present in the polymerization system along with the $C_{12}$ mercaptan modifier. However, the same amount of olefin contaminant in the mercaptan modifiers of this invention causes no adverse effect, but possibly a favorable slight softening effect in the rubber polymer. A slightly softer polymer was also obtained with a $C_{10}$ mercaptan containing 0.10 phm. of $C_{10}$ olefin as compared to a $C_{10}$ mercaptan without olefin contamination. Likewise, a $C_{11}$ mercaptan containing 0.1 phm. of $C_{11}$ olefin showed no stiffening effects on an SBR-1500 recipe.

EXAMPLE 3.—USE OF SBR-1000 ("HOT") RUBBER RECIPES

A rubber was prepared from styrene and butadiene by polymerization at 122° F. of the following SBR-1000 recipe.

Ingredients: Parts by weight
  Butadiene _____ 72
  Styrene _____ 28
  Water _____ 180
  Mercaptan _____ 0.30
  Sodium fatty acid soap _____ 4.7
  $K_2S_2O_8$ _____ 0.40

The mercaptans used were an essentially 50:50 mixture of $C_{10}$ and $C_{11}$ mercaptan and a commercially available $C_{12}$ mercaptan derived from propylene tetramer. As in previous examples, Mooney viscosity data were used to evaluate the modifier efficiencies. Table III lists the time of polymerization, the percent conversion, and Mooney viscosity data.

*Table III*

EFFICIENCY OF VARIOUS MERCAPTANS IN SBR-1000 ("HOT") RUBBER RECIPIES

| Mercaptan modifier (0.30 phm.) | Polymerization time (hrs.) | Percent conversion | Mooney viscosity data | |
|---|---|---|---|---|
| | | | ML 1'+4' | ML 1'+10' |
| $C_{10}SH+C_{11}SH$ | 2.0 | 10.3 | 19.5 | 16.0 |
| | 4.0 | 26.7 | | |
| | 6.0 | 44.2 | | |
| | 7.75 | 56.8 | | |
| $C_{12}SH$ | 2.0 | 10.7 | 21.0 | 17.5 |
| | 4.0 | 26.7 | | |
| | 6.0 | 43.6 | | |
| | 7.75 | 55.8 | | |
| $C_{10}SH+C_{11}SH$ | 2.5 | 19.2 | 39.0 | 32.0 |
| | 5.0 | 39.5 | | |
| | 8.0 | 64.6 | | |
| | 9.25 | 72.2 | | |
| $C_{12}SH$ | 2.5 | 19.3 | 40.0 | 32.5 |
| | 5.0 | 39.6 | | |
| | 8.0 | 64.7 | | |
| | 9.25 | 71.3 | | |

It is quite evident from Table III that with SBR-1000 rubber recipes, the $C_{10}$ and $C_{11}$ mercaptans are not significantly better than the commercially available $C_{12}$ mercaptan. Thus, it is clear that the present invention is limited to the use of $C_{10}$ and $C_{11}$ mercaptans in low temperature polymerization systems such as SBR-1500 recipes where polymerization is carried out at temperatures below about 50° F.

EXAMPLE 4.—COMPARISON OF $C_{10}SH$ AND $C_{11}SH$ MIXTURE WITH OTHER MERCAPTAN MIXTURES

Using the procedure of Example 1 with the same SBR-1500 recipe, polymerizations were made using a commercially available mercaptan mixture known as Mixed Tertiary Mercaptans (MTM available from Phillips Petroleum Co.) and consisting essentially on a weight basis of 60% $C_{12}$ mercaptan, 20% $C_{14}$ mercaptan and 20% $C_{16}$ mercaptan. Table IV indicates the conditions of the polymerization and compares the product with the $C_{10}$ and $C_{11}$ mercaptan mixture of this invention.

*Table IV*

COMPARISON OF $C_{10}SH$ AND $C_{11}SH$ MIXTURE WITH OTHER MIXED TERTIARY MERCAPTANS IN SBR-1500 RECIPE

| Mercaptan modifier (0.17 phm.) | Rate data | | Mooney viscosity data | |
|---|---|---|---|---|
| | Time, hrs. | Percent conversion | ML 1'+4' | ML 1'+10' |
| 60% $C_{12}$, 20% $C_{14}$, 20% $C_{16}$ | 1.5 | 19.7 | >136 | 129 |
| | 4.0 | 42.8 | | |
| | 5.5 | 59.3 | | |
| | 5.75 | 63.2 | | |
| 50% $C_{10}$, 50% $C_{11}$ | 1.5 | 19.3 | 52.0 | 45.0 |
| | 4.0 | 44.0 | | |
| | 5.5 | 59.6 | | |
| | 5.75 | 60.4 | | |

It is clear that the $C_{10}$–$C_{11}$ mercaptan mixture is vastly superior to the MTM mixture in modifier efficiency.

EXAMPLE 5.—COMPARATIVE EFFICIENCIES OF $C_{10}$–$C_{11}$ MERCAPTAN MIXTURES AND $C_{12}$ MERCAPTAN IN SBR-1500 RECIPES

The data presented in following Table V were obtained in accordance with the procedures detailed in Example 1.

Table V
COMPARATIVE EFFICIENCIES OF $C_{10}$-$C_{11}$ MERCAPTAN VS. $C_{12}$ MERCAPTAN

| Mercaptan modifier | Modifier concentration, phm. | Rate data | | Mooney viscosity | |
|---|---|---|---|---|---|
| | | Time, hrs. | Percent conversion | ML 1'+4' | ML 1'+10' |
| $C_{10}$-$C_{11}$ | 0.17 | 1.5<br>4.0<br>5.5<br>5.75 | 19.8<br>42.7<br>57.3<br>58.4 | 46.0 | 40.5 |
| $C_{12}$ | 0.20 | 1.5<br>4.0<br>5.5<br>5.75 | 20.8<br>44.8<br>58.3<br>57.8 | 58.5 | 51.5 |
| $C_{10}$-$C_{11}$ | 0.16 | 1.5<br>4.0<br>6.0<br>6.25 | 18.3<br>40.3<br>60.8<br>60.0 | 52.5 | 46.0 |
| $C_{12}$ | 0.20 | 1.5<br>4.0<br>6.0<br>6.25 | 19.2<br>41.5<br>60.8<br>61.5 | 60.5 | 52.5 |
| $C_{10}$-$C_{11}$ | 0.15 | 1.5<br>3.75<br>4.75<br>5.0 | 22.3<br>45.0<br>57.0<br>60.4 | 60.5 | 53.0 |
| $C_{10}$-$C_{11}$ | 0.14 | 1.5<br>3.75<br>4.75<br>5.0 | 22.3<br>47.1<br>58.5<br>61.0 | 61.0 | 54.0 |
| $C_{12}$ | 0.20 | 1.5<br>3.75<br>4.75<br>5.0 | 23.5<br>47.6<br>59.3<br>59.9 | 56.5 | 48.0 |

Study of the above table indicates that at the same rate and conversion the $C_{10}$-$C_{11}$ mercaptan gave lower Mooney viscosities at 0.17 phm. than did $C_{12}$ mercaptan at 0.20 phm. From this and the remaining data in the table it is estimated that the $C_{10}$-$C_{11}$ mercaptan is 20% to 25% more efficient as a polymerization modifier.

EXAMPLE 6.—COMPARISON OF $C_9$, $C_{10}$ AND $C_{11}$ BLENDS WITH $C_{12}$ MERCAPTAN

Following the polymerization recipe of Example 1 the data in Table VI were obtained:

Table VI
PERFORMANCE OF VARIOUS BLENDS OF TERTIARY-$C_9$ AND $C_{10}$-$C_{11}$ MERCAPTANS IN SBR-1500 RECIPE

| Mercaptan modifier (0.20 phm.) | Rate data | | Mooney viscosity | |
|---|---|---|---|---|
| | Time, hrs. | Percent conversion | ML 1'+4' | ML 1'+10' |
| 50:50 blend of $C_9$ and $C_{10}$-$C_{11}$ (1:1) mercaptans. | 1.5<br>4.0<br>6.5 | 16.6<br>38.5<br>59.7 | 41.5 | 36.0 |
| $C_{12}SH$ | 1.5<br>4.0<br>6.25 | 18.1<br>40.2<br>58.8 | 48.5 | 41.5 |
| 25:75 blend of $C_9$ and $C_{10}$-$C_{11}$ (1:1) mercaptans. | 1.5<br>4.0<br>6.0 | 19.7<br>41.5<br>61.3 | 41.0 | 35.5 |
| 75:25 blend of $C_9$ and $C_{10}$-$C_{11}$ (1:1) mercaptans. | 1.5<br>4.0<br>6.0 | 17.4<br>43.0<br>60.3 | 43.0 | 36.5 |
| $C_{12}SH$ | 1.5<br>4.0<br>5.5 | 18.7<br>45.0<br>61.0 | 58.0 | 49.0 |
| 10:90 blend of $C_9$ and $C_{10}$-$C_{11}$ (1:1) mercaptans. | 1.5<br>4.0<br>5.75 | 18.5<br>43.4<br>59.2 | 35.5 | 31.5 |
| 90:10 blend of $C_9$ and $C_{10}$-$C_{11}$ (1:1) mercaptans. | 1.5<br>4.0<br>6.0 | 17.0<br>41.9<br>59.2 | 40.0 | 34.0 |
| $C_{12}SH$ | 1.5<br>4.0<br>5.5 | 20.5<br>46.1<br>58.2 | 55.5 | 47.5 |

It is clear from the above table that the $C_9$, $C_{10}$ and $C_{11}$ mercaptan blends give improved efficiency over $C_{12}$ mercaptan. Also of interest is that the polymerization rate is not significantly affected at even the higher concentrations of $C_9$ mercaptan although there is some slight decrease in rate when the $C_9$ content of the blend is about 75% by weight or higher.

EXAMPLE 7.—EFFECT OF $C_9$ MERCAPTAN IN BLEND OF $C_{10}$ AND $C_{11}$ MERCAPTAN

Using the polymerization recipe of Example 1, the data in Table VII were obtained:

Table VII
PERFORMANCE OF VARIOUS BLENDS OF TERTIARY-$C_9$ AND $C_{10}$-$C_{11}$ MERCAPTANS IN SBR-1500 RECIPE ($C_{10}$-$C_{11}$ MERCAPTAN CONTROL)

| Mercaptan modifier (0.20 phm.) | Rate data | | Mooney viscosity | |
|---|---|---|---|---|
| | Time, hrs. | Percent conversion | ML 1'+4' | ML 1'+10' |
| 50:50 blend of $C_9$ and $C_{10}$-$C_{11}$ (1:1) mercaptans. | 1.5<br>4.0<br>5.75<br>6.0 | 21.9<br>43.4<br>62.5<br>67.0 | 45.5 | 39.5 |
| $C_{10}$-$C_{11}$ mercaptan mixture (1:1). | 1.5<br>4.0<br>5.25<br>5.5 | 20.0<br>45.5<br>59.5<br>64.8 | 39.5 | 34.5 |
| 25:75 blend of $C_9$ and $C_{10}$-$C_{11}$ (1:1) mercaptans. | 1.5<br>4.0<br>6.0 | 19.0<br>40.6<br>65.3 | 45.0 | 38.0 |
| 75:25 blend of $C_9$ and $C_{10}$-$C_{11}$ (1:1) mercaptans. | 1.5<br>4.0<br>6.0 | 17.6<br>40.7<br>62.4 | 43.0 | 37.0 |
| $C_{10}$-$C_{11}$ mercaptan mixture (1:1). | 1.5<br>4.0<br>5.5 | 18.6<br>43.7<br>60.7 | 37.0 | 32.5 |
| 10:90 blend of $C_9$ and $C_{10}$-$C_{11}$ (1:1) mercaptans. | 1.5<br>4.0<br>5.0 | 20.0<br>50.1<br>57.4 | 34.5 | 30.0 |
| 90:10 blend of $C_9$ and $C_{10}$-$C_{11}$ (1:1) mercaptans. | 1.5<br>4.0 | 18.5<br>44.3 | 41.0 | 35.0 |
| $C_{10}$-$C_{11}$ mercaptan mixture (1:1). | 1.5<br>4.0<br>5.0 | 20.3<br>50.2<br>59.6 | 39.0 | 33.5 |

The above data indicate not only that mixtures of $C_9$, $C_{10}$ and $C_{11}$ mercaptans are useful modifiers, but also the surprising fact that at the 10% level of $C_9$ mercaptan in a $C_{10}$-$C_{11}$ mixture the modifiers' efficiency is increased over the $C_{10}$-$C_{11}$ mixture. Furthermore, this latter improvement achieved with no loss in rate of polymerization.

It will be understood that in certain applications it may be desirable to obtain advantages by combining the $C_9$, $C_{10}$, $C_{11}$ or mixtures of $C_9$, $C_{10}$ and $C_{11}$ mercaptans with other modifiers. Thus, for example, this invention can be used to upgrade an inefficient modifier by adding $C_9SH$, $C_{10}SH$, $C_{11}SH$ or their mixture to the poor modifier.

The advantages of the invention are clearly evident from the above examples and the invention represents a decided advance in the art of rubber technology. It will, of course, be evident to the skilled art worker that many modifications and changes may be made from the above description and examples without departing from the spirit and scope of the invention.

We claim:
1. In the process of preparing a cold rubber polymer by copolymerizing a butadiene and a styrene in an aqueous emulsion system, the improvement which comprises modifying said polymerization with a mercaptan mixture consistiing of decyl and undecyl mercaptan, and wherein said mercaptans are secondary and tertiary isomers and are present in an amount sufficient to limit the molecular weight of said polymer to a plastic workable mass, said mercaptan mixture being prepared by the reaction of hydrogen sulfide with an olefinic polymer selected from the group consisting of polymers of propylene, butylene, amylene and mixtures of such olefinic polymers.

2. A process as in claim 1 wherein the mercaptan modifier mixture is used in an amount from about 0.05 to about 0.50 part per 100 parts of monomers.

3. In the process of producing a rubber copolymer by copolymerizing styrene and butadiene in an aqueous emulsion system at a temperature between about 15° and 50° F., the improvement which comprises modifying such polymerization with from about 0.10 to about 0.3 part per 100 parts of monomers of a mercaptan mixture of decyl and undecyl mercaptan, wherein said mercaptans are secondary and tertiary isomers and said mercaptan mixture is prepared by the reaction of hydrogen sulfide with an olefinic polymer selected from the group consisting of polymers of propylene, butylene, amylene and mixtures of such olefinic polymers.

4. In the process of preparing a cold rubber polymer by copolymerizing a styrene and a butadiene in an aqueous emulsion system, the improvement which comprises modifying said polymerization with from about 0.05 to about 0.50 part per one hundred parts of monomers of a mercaptan modifier comprising a mixture of decyl and undecyl mercaptan in a weight ratio of 10:90 to 90:10, said decyl and undecyl mercaptans consisting essentially of secondary and tertiary mercaptans, said mercaptan mixtures being prepared by the reaction of hydrogen sulfide with an olefinic polymer selected from the group consisting of polymers of propylene, butylene, amylene and mixtures of such olefinic polymers.

5. In the process of preparing a cold rubber polymer by copolymerizing styrene and butadiene in an aqueous emulsion system, the improvement which comprises modifying said polymerization with from about 0.10 to about 0.3 part per one hundred parts of monomers of a mercaptan modifier comprising a mixture of essentially equal parts by weight of decyl and undecyl mercaptans, said decyl and undecyl mercaptans consisting essentially of secondary and tertiary mercaptans, said mercaptan mixtures being prepared by the reaction of hydrogen sulfide with an olefinic polymer selected from the group consisting of polymers of propylene, butylene, amylene and mixtures of such olefinic polymers.

6. The process of claim 4 wherein the mercaptan modifiers are contaminated with olefin.

References Cited by the Examiner
UNITED STATES PATENTS

| | | | |
|---|---|---|---|
| 2,549,961 | 4/51 | Crouch et al. | 260—84.3 |
| 2,625,537 | 1/53 | Kolthoff et al. | 260—94.4 |
| 2,739,138 | 3/56 | Karasch et al. | 260—84.3 |

OTHER REFERENCES

Whitby: Synthetic Rubber, 1954, Wiley & Sons, Inc., N. Y., pages 222 and 246.

JOSEPH L. SCHOFER, *Primary Examiner.*

M. LIEBMAN, *Examiner.*